United States Patent
Reeves et al.

(10) Patent No.: US 7,236,848 B2
(45) Date of Patent: Jun. 26, 2007

(54) DATA REPRESENTATION RELATING TO A NON-SAMPLED WORKPIECE

(75) Inventors: Steven P. Reeves, Austin, TX (US); Michael G. McIntyre, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 0 days.

(21) Appl. No.: 11/224,388

(22) Filed: Sep. 12, 2005

(65) Prior Publication Data

US 2007/0061032 A1 Mar. 15, 2007

(51) Int. Cl.
*G06F 19/00* (2006.01)

(52) U.S. Cl. ............... 700/121; 700/108; 702/182

(58) Field of Classification Search ............ 438/5, 438/9, 14; 700/108–110, 121; 702/182
See application file for complete search history.

(56) References Cited

U.S. PATENT DOCUMENTS

| | | | |
|---|---|---|---|
| 6,790,686 B1 * | 9/2004 | Purdy et al. | 438/14 |
| 6,834,213 B1 * | 12/2004 | Sonderman et al. | 700/121 |
| 6,937,914 B1 * | 8/2005 | Bode et al. | 700/121 |
| 6,957,120 B1 * | 10/2005 | Bode et al. | 700/121 |
| 2004/0029299 A1 * | 2/2004 | Pasadyn et al. | 438/5 |

\* cited by examiner

*Primary Examiner*—Leo Picard
*Assistant Examiner*—Douglas S. Lee
(74) *Attorney, Agent, or Firm*—Williams, Morgan & Amerson, P.C.

(57) ABSTRACT

A method, apparatus, and a system for providing data representation associated with non-sampled workpieces. Measured metrology data relating to a first workpiece is received. Metrology data corresponding to a second workpiece is approximated based upon the metrology data relating to the first workpiece to provide a projected metrology data relating to the second workpiece.

32 Claims, 7 Drawing Sheets

DATA REPRESENTATION RELATING TO A NON-SAMPLED WORKPIECE

BACKGROUND OF THE INVENTION

1. Field of the Invention

This invention relates generally to semiconductor manufacturing, and, more particularly, to a method and apparatus for providing data representation associated with workpieces that were not sampled.

2. Description of the Related Art

The technology explosion in the manufacturing industry has resulted in many new and innovative manufacturing processes. Today's manufacturing processes, particularly semiconductor manufacturing processes, call for a large number of important steps. These process steps are usually vital, and therefore, require a number of inputs that are generally fine-tuned to maintain proper manufacturing control.

The manufacture of semiconductor devices requires a number of discrete process steps to create a packaged semiconductor device from raw semiconductor material. The various processes, from the initial growth of the semiconductor material, the slicing of the semiconductor crystal into individual wafers, the fabrication stages (etching, doping, ion implanting, or the like), to the packaging and final testing of the completed device, are so different from one another and specialized that the processes may be performed in different manufacturing locations that contain different control schemes.

Generally, a set of processing steps is performed across a group of semiconductor wafers, sometimes referred to as a lot. For example, a process layer that may be composed of a variety of different materials may be formed across a semiconductor wafer. Thereafter, a patterned layer of photoresist may be formed across the process layer using known photolithography techniques. Typically, an etch process is then performed across the process layer using a patterned layer of photoresist as a mask. This etching process results in the formation of various features or objects in the process layer. Such features may be used as, for example, a gate electrode structure for transistors. Many times, trench isolation structures are also formed across the substrate of the semiconductor wafer to isolate electrical areas across a semiconductor wafer. One example of an isolation structure that can be used is a shallow trench isolation (STI) structure.

The manufacturing tools within a semiconductor manufacturing facility typically communicate with a manufacturing framework or a network of processing modules. Each manufacturing tool is generally connected to an equipment interface. The equipment interface is connected to a machine interface to which a manufacturing network is connected, thereby facilitating communications between the manufacturing tool and the manufacturing framework. The machine interface can generally be part of an advanced process control (APC) system. The APC system initiates a control script, which can be a software program that automatically retrieves the data needed to execute a manufacturing process.

FIG. 1 illustrates a typical semiconductor wafer 105. The semiconductor wafer 105 typically includes a plurality of individual semiconductor die 103 arranged in a grid 150. Using known photolithography processes and equipment, a patterned layer of photoresist may be formed across one or more process layers that are to be patterned. As part of the photolithography process, an exposure process is typically performed by a stepper on single or multiple die 103 locations at a time, depending on the specific photomask employed. The patterned photoresist layer can be used as a mask during etching processes, wet or dry, performed on the underlying layer or layers of material, e.g., a layer of polysilicon, metal or insulating material, to transfer the desired pattern to the underlying layer. The patterned layer of photoresist is comprised of a plurality of features, e.g., line-type features or opening-type features that are to be replicated in an underlying process layer.

Turning now to FIG. 2, a flowchart depiction of an illustrative prior art process flow is depicted. A manufacturing system may process one or more semiconductor wafers 105 (block 210). These wafers may be part of a batch or a lot. Upon performing at least one process on a plurality of wafers, the manufacturing system may acquire metrology data relating to selected wafers from a batch or a lot of wafers (block 220). Data relating to the sampled wafers may be used to calculate modifications to process steps performed on the wafers. Based upon the calculated modifications, feedback adjustments may be implemented upon processes performed on subsequent wafers (block 230).

There may be several problems associated with current methodologies relating to processing semiconductor wafers. One of the problems includes the fact that metrology data, may not be available for substantially every wafer that was processed. This may result in missing points of data when analyzing process results. There could be various negative implications as a result of the missing data. For example, post process analysis may be impeded by a lack of data relating to certain processed wafers. Often, there may be a desire to correlate certain metrology data to post-process results to perform manufacturing analysis. However, state-of-the-art methodologies may only provide metrology data for sampled wafers. Therefore, post process analysis may be performed with less than the desired amount of data, potentially resulting in a lack of accuracy in the post process analysis.

Additionally, when performing a post-process analysis, some of the sampled wafers that were analyzed to acquire data may not be available during the post process stage. For example, previously sampled wafers may have been scrapped as a result of subsequent process errors. Therefore, at the end of line of a series of processes performed on the wafers, some of the sampled wafers may not be available for further post-process analysis. This may leave a significant gap in the analysis of process results. Additionally, some wafers may be diverted to rework stages or to other process stages, therefore, the sample wafers may not be available at the end of line stage. This may also detrimentally affect the post-process analysis.

When data from substantially all wafers, or die regions on the wafers, is not available, accuracy relating to post process analysis may suffer. However, acquiring metrology data from each processed wafer may not be an efficient process and may slow down the overall processing stage. Additionally, factory resources may be overtaxed when attempting to acquire metrology data from each processed wafer. Therefore, the industry lacks an efficient solution to the problems stemming from the lack of resources for acquiring metrology data for each processed wafer. The industry also lacks an efficient solution to the problems associated with discrepancies in the metrology data derived from sampling a portion of a set of processed wafers.

The present invention is directed to overcoming, or at least reducing, the effects of one or more of the problems set forth above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one aspect of the present invention, a method is for approximating a metrology value relating to a non-sampled workpiece. Measured metrology data relating to a first workpiece is received. Metrology data corresponding to a second workpiece is approximated based upon the metrology data relating to the first workpiece to provide a projected metrology data relating to the second workpiece.

In another aspect of the present invention, a method is provided for approximating a metrology value relating to a non-sampled workpiece. A first process is performed upon a first workpiece. Metrology data relating to the first workpiece resulting from the first process is acquired. The first process upon a second workpiece is performed. A relationship between the first process and the metrology data relating to the first workpiece is modeled. An estimated metrology data relating to the second workpiece resulting from the first process is determined. This determination is based upon the modeling of the relationship between the first process and the metrology data.

In another aspect of the present invention, a method is provided for approximating a metrology value relating to a non-sampled workpiece. A process upon a plurality of workpieces is performed. A set of sampled workpieces from the plurality of workpieces is selected. Actual metrology data relating to the sampled workpieces is acquired. A metrology data relationship between the plurality of workpieces and the acquired approximate metrology data for the process is modeled. Projected metrology data relating to non-sampled workpieces is generated based upon the modeled relationship. The projected metrology data is assigned to the non-sampled workpieces.

In another aspect of the present invention, a method is provided for approximating a metrology value relating to a non-sampled workpiece. A process upon a plurality of workpieces is performed. A set of sampled workpieces from the plurality of workpieces is selected. Actual metrology data relating to the sampled workpieces is acquired. A metrology data relationship between the plurality of workpieces and the acquired approximate metrology data for the process is modeled. Projected metrology data relating to non-sampled workpieces is generated based upon the modeled relationship. The projected metrology data relating to non-sampled workpieces is stored.

In another aspect of the present invention, a system is provided for approximating a metrology value relating to a non-sampled workpiece. The system of the present invention includes a plurality of workpieces and a metrology tool to acquire metrology data from a sample workpiece from the plurality of workpieces. The system also includes a controller to approximate corresponding metrology data relating to at least one non-sampled workpiece from the plurality of workpieces based upon the metrology data relating to the sampled workpiece to provide a projected metrology data.

In another aspect of the present invention, an apparatus is provided for approximating a metrology value relating to a non-sampled workpiece. The apparatus of the present invention includes a controller to approximate corresponding metrology data relating to at least one non-sampled workpiece from plurality of processed plurality of workpieces based upon metrology data relating to the sampled workpiece to provide a projected metrology data.

In yet another aspect of the present invention, a computer readable program storage device encoded with instructions is provided for approximating a metrology value relating to a non-sampled workpiece. The computer readable program storage device encoded with instructions that, when executed by a computer, performs a method, comprising receiving measured metrology data relating to a first workpiece. The method also includes approximating metrology data corresponding to a second workpiece based upon the metrology data relating to the first workpiece to provide a projected metrology data relating to the second workpiece.

BRIEF DESCRIPTION OF THE DRAWINGS

The invention may be understood by reference to the following description taken in conjunction with the accompanying drawings, in which like reference numerals identify like elements, and in which.

Figure 1:
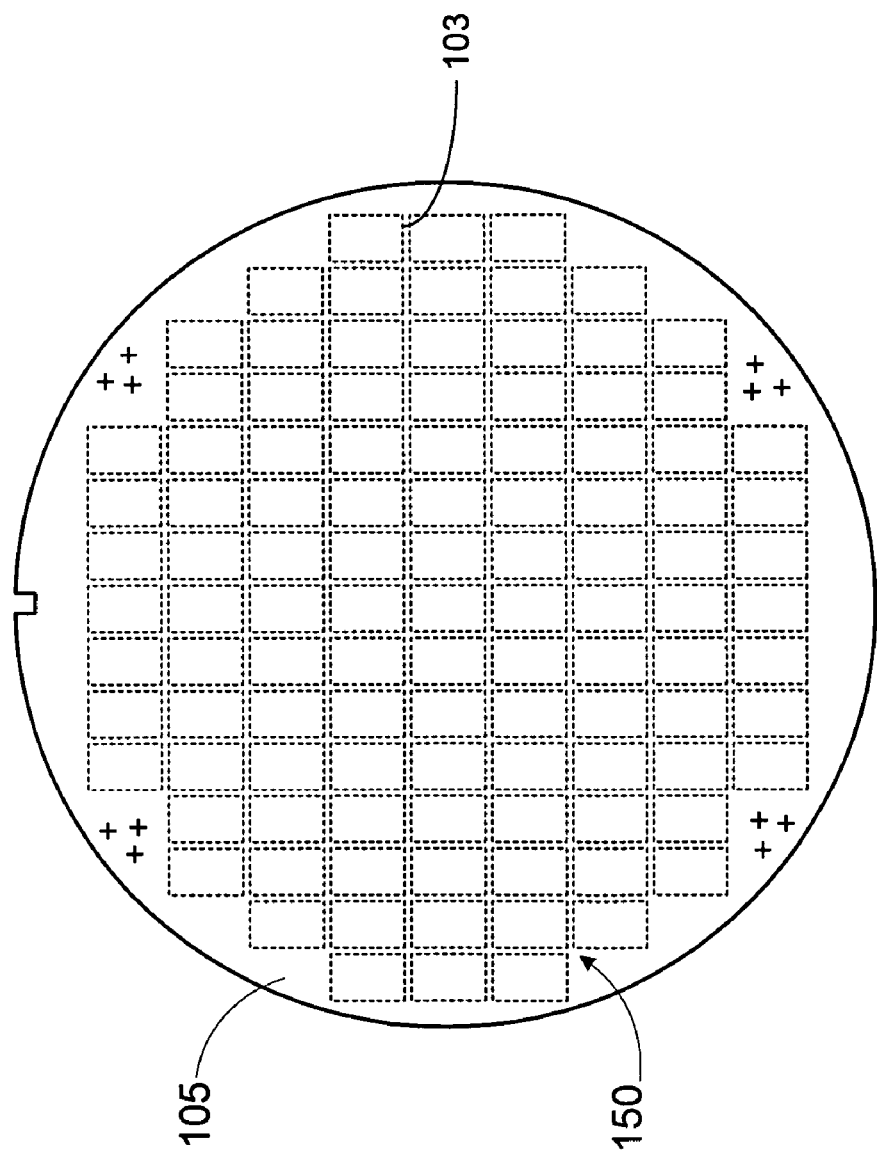
FIG. 1 illustrates a stylized depiction of a semiconductor wafer that may be processed by a semiconductor manufacturing system.
Figure 2:
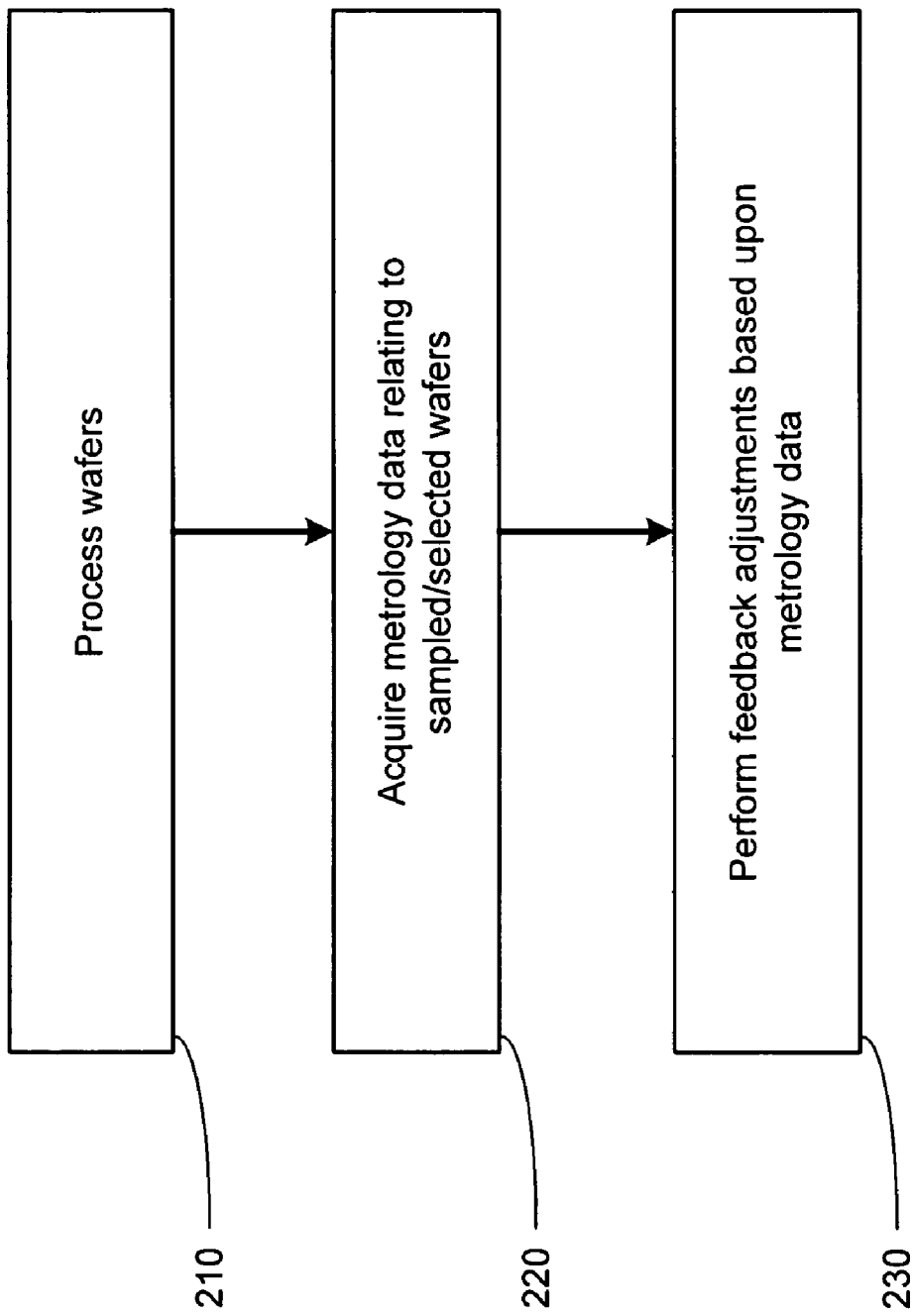
FIG. 2 illustrates a flowchart depiction of a prior art method for processing semiconductor wafers.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will, of course, be appreciated that in the development of any such actual embodiment, numerous implementation-specific decisions may be made to achieve the developers' specific goals, such as compliance with system-related and business-related constraints, which may vary from one implementation to another. Moreover, it will be appreciated that such a development effort might be complex and time-consuming, but may nevertheless be a routine undertaking for those of ordinary skill in the art having the benefit of this disclosure.

The present invention will now be described with reference to the attached figures. Various structures, computers, process tools, and systems are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Portions of the invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

There are many discrete processes that are involved in semiconductor manufacturing. Workpieces (e.g., semiconductor wafers 105, semiconductor devices, etc.) are typically stepped through multiple manufacturing process tools. Embodiments of the present invention provide for predicting and/or assigning process data for wafers that were not measured. Process profiles, process variations, signatures or tags associated with certain measured wafers, etc., may be used to estimate process data relating to unmeasured or non-sampled wafers. Inline and/or offline metrology data may be modeled and may be assigned to non-sampled wafers based upon measured metrology data, tool state data, and/or other manufacturing-related data. In one embodiment, inline metrology data includes metrology data acquired by a standalone metrology tool yielding data associated with a particular processing operation or tied to a particular process. For example, inline metrology data may include data relating to film thickness, line-width of certain features on processed wafers, overlay measurements resulting from photolithography measurements, and the like. In one embodiment, offline metrology data includes metrology data that is substantially not part of the production flow during processing of semiconductor wafers 105. For example, offline metrology data may refer to electrical test results of the processed semiconductor wafers 105, yield of the processed wafers, and the like.

Additionally, a statistical confidence factor may be calculated based upon manufacturing data, current or historical process data, and the like. The statistical confidence may provide an indication of the confidence level associated with the modeled metrology data relating to non-sampled wafers.

Utilizing embodiments of the present invention, estimated inline and/or offline metrology data may be associated with non-sampled wafers. The assignment of the estimated inline and/or offline metrology data to specific non-sampled wafers may be beneficial in performing various manufacturing-related analyses, such as post process analysis, process performance analysis, tool-state process analysis, etc. Additionally, the problems associated with sampled wafers dropping out from a production line may be attenuated as a result of the availability of estimated metrology data relating to non-sampled wafers.

Figure 3:
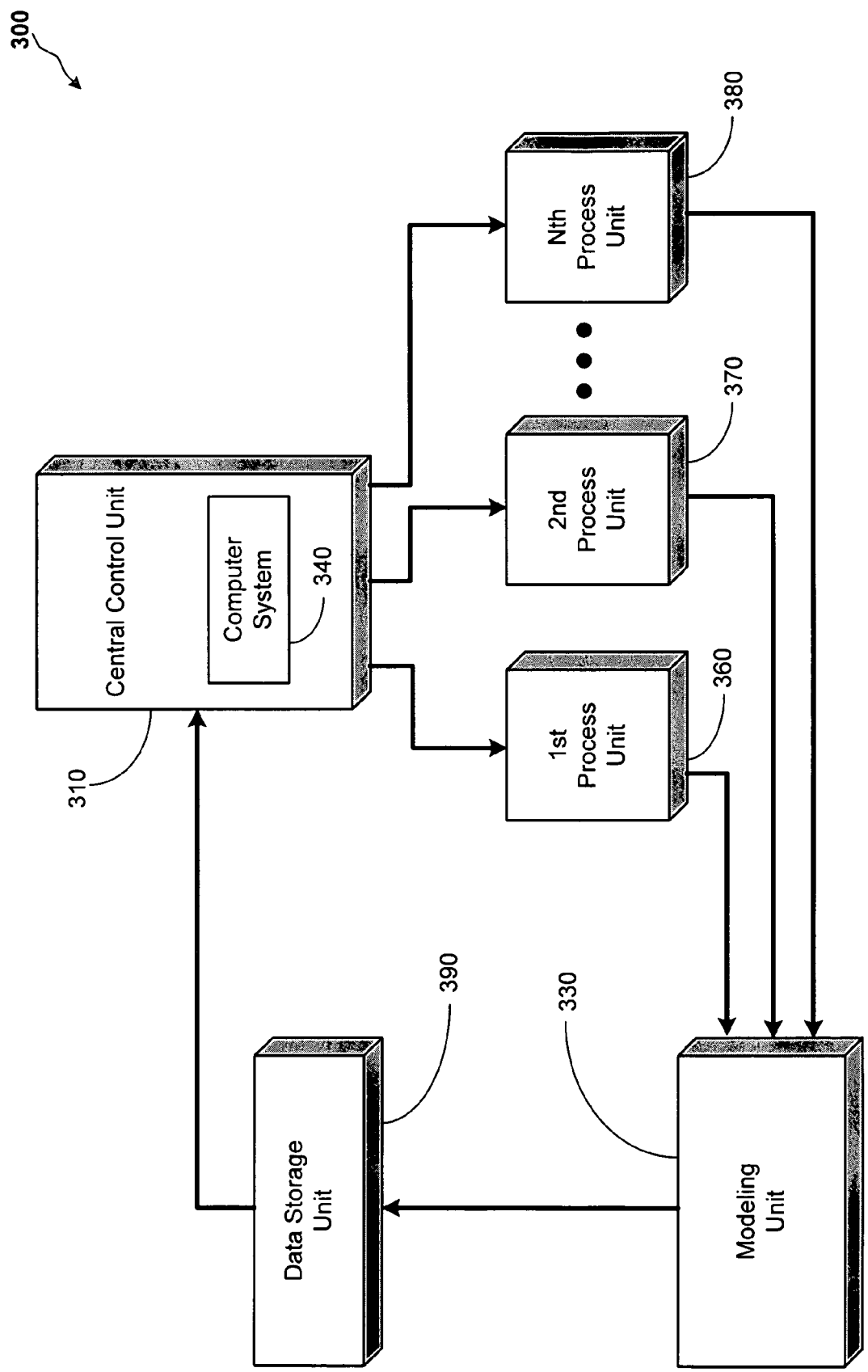
FIG. 3 illustrates a block diagram of a system in accordance with one illustrative embodiment of the present invention.

Turning now to FIG. 3, a block diagram depiction of a system, in accordance with an illustrative embodiment of the present invention, is provided. The system 300 comprises a central control unit 310 that is capable of overseeing and affecting the respective operations of a plurality of process control segments in a factory/fab. For example, a factory may comprise various processing tools that are controlled by one or more tool controllers that may be part of a process control unit.

The central control unit 310 is capable of receiving data and/or instructions from external sources (i.e., sources external to a factory/fab), as well as from internal sources (i.e., sources internal to a factory/fab), to affect the operation of various components of a factory. The central control unit 310 may also comprise a computer system 340 that is capable of performing various tasks, such as calculating modifications of various parameters and generating control parameters in response to various external and/or internal data. These control parameters may then be used to direct the operation of various components of the factory/fab.

The system 300 may also comprise a $1^{st}$ process unit 360, a $2^{nd}$ process unit 370 through an $N^{th}$ process unit 380. The $1^{st}$ through $N^{th}$ process units 360-380 may comprise one or more processing tools, a process controller, and/or other elements for performing wafer processing. More detailed descriptions of the $1^{st}$ through $N^{th}$ process units 360-380 are provided in FIG. 4 and accompanying description below.

Continuing referring to FIG. 3, the system 300 may also comprise a data storage unit 390 that is capable of receiving inline and/or offline metrology data, as well as tool state data from the various processing units 360-380. In one embodiment, tool state data may refer to pressure data, gas flow rate data, temperature data, humidity data relating to a chamber associated with a processing tool. The data storage unit 390 may also contain manufacturing data relating to previously processed wafers. Further, the data storage unit 390 may store estimated inline and/or offline metrology data relating to non-sampled processed wafers. Hence, the combination of actual metrology data relating to sampled wafers, and estimated metrology data relating to non-sampled wafers, may be grouped together to form a complete set of metrology data for each processed wafer. Inline and/or offline metrology data relating to substantially all of the wafers in a batch or lot may be compiled, sorted, and stored in the data storage unit 390. The data storage unit 390 may include components that allow for access of its content by various components external and/or internal to the system 300.

The system 300 may also comprise a modeling unit 330 that is capable of modeling inline and/or offline metrology data relating to non-measured or non-sampled wafers. Various factors, such as tool state data, metrology data relating to sampled wafers, statistical analysis, historical data, process parameters, etc., may be used by the modeling unit 330 to perform an approximation or calculation of inline data and/or offline metrology data relating to non-sampled wafers. The system 300 may tag the non-sampled wafers and/or the sampled wafers for readily facilitating identification of the non-sampled wafers.

Various components illustrated in the system 300, including the central control unit 310, the modeling unit 330, etc., may comprise hardware, software, and/or firmware units, or may be comprised of any combination thereof. The data storage unit 390 may comprise a memory control portion as well as a memory storage portion to store data.

Figure 4:
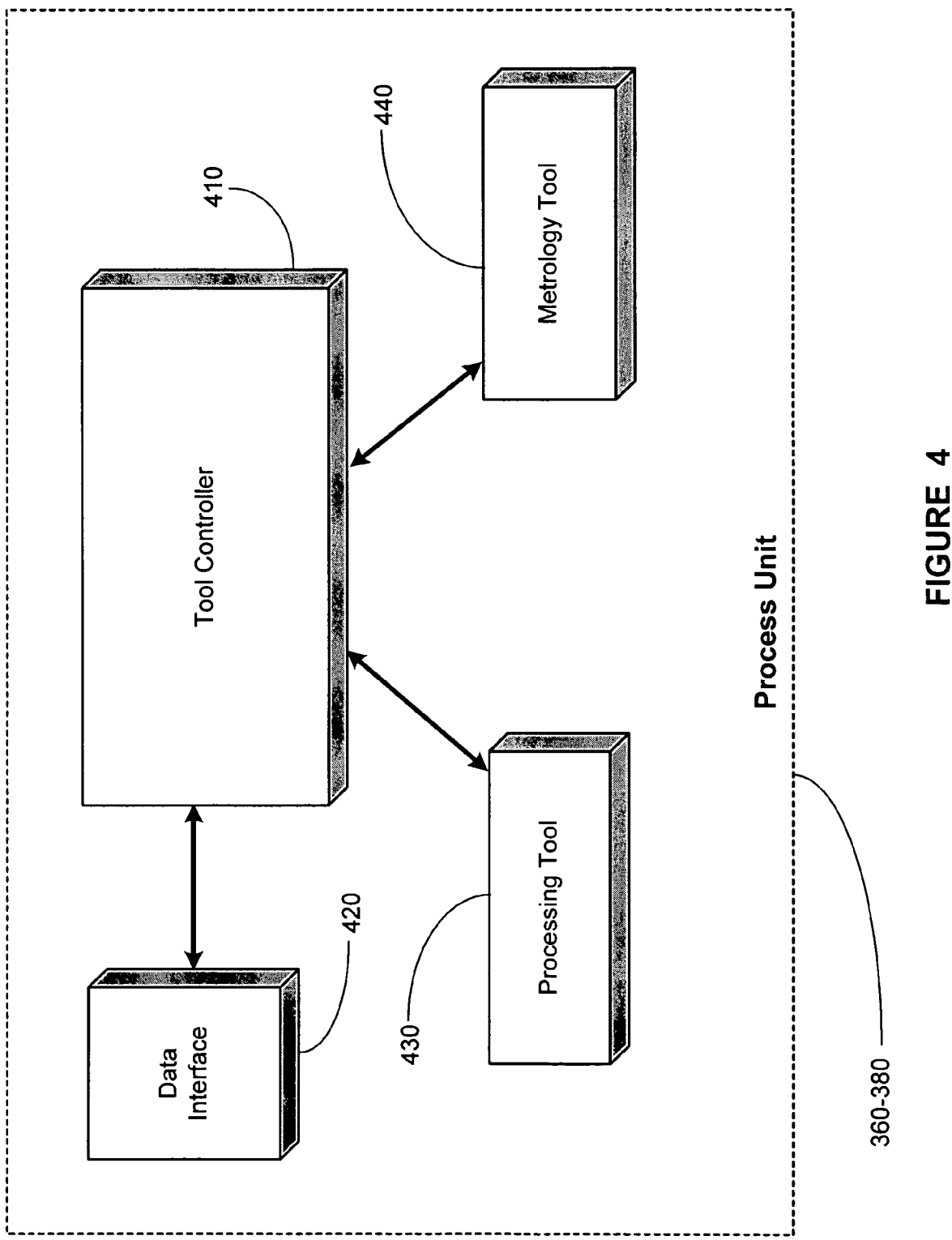
FIG. 4 illustrates a more detailed block diagram depiction of a process unit of FIG. 3, in accordance with one illustrative embodiment of the present invention.

Turning now to FIG. 4, a block diagram depiction of the process units 360-380 in accordance with one illustrative embodiment of the present invention is provided. Each of the process units 360-380 may comprise a tool controller 410 that is capable of controlling the operation of a processing tool 430 and/or a metrology tool 440. In one illustrative embodiment, the processing tool 430 may be an etch tool, a deposition tool, a chemical-mechanical polishing (CMP) tool, a photolithography tool, or any other tool capable of processing semiconductor wafers 105. The metrology tool 440 is capable of acquiring inline and/or offline metrology data relating to a processed semiconductor wafer 105. The metrology tool 440 may be a stand-alone tool or it may be integrated with the processing tool 430 itself. A data interface 420 may receive data from, and/or send data to, the central control unit 310. The data received by the data interface 420 may be used to control various components of the process units 360-380, including directing the operation of the processing tool 430 and the metrology tool 440.

Turning now to FIGS. 5A-5D, various exemplary graphical illustrations relating to the modeling of metrology data relating to non-sampled wafers is depicted. The illustrations provided in FIGS. 5A-5D may be calculated by the modeling unit 330 using various algorithms. These relationships may be based on actual measured data, as well as historical data, known tool behavior, tool variations, tool state data, process variations, and the like.

Figure 5A:
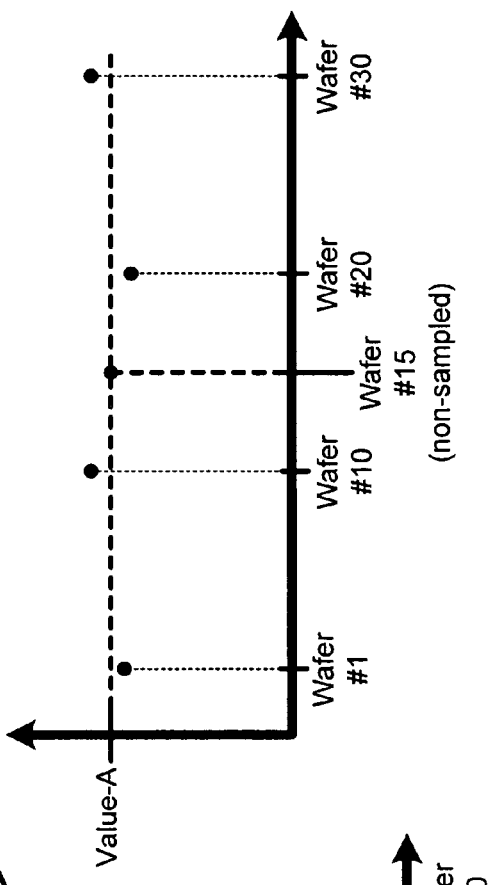
FIGS. 5A-5D illustrate exemplary graphical illustrations of the modeling of metrology measurements, in accordance with various illustrative embodiments of the present invention.

As illustrated in FIG. 5A, a substantially linear relationship may be developed between various values relating to particular metrology measurements associated a batch or lot of wafers. As a simplified, illustrative example, a batch or lot of wafers may comprise wafer #1 through wafer #30. Several wafers in the batch may be selected for actual measurements. For example, wafer #1, wafer #10, wafer #20, and wafer #30 from a particular lot may be selected for acquisition of metrology data. As illustrated in FIG. 5A, the metrology measurement of wafer #1 may relate to a metrology value-A; the metrology measurement relating to wafer #10 may result in metrology value-B; a metrology measurement relating to wafer #20 may result in metrology value-C, and metrology measurement relating to wafer #30 may result in metrology value-D. These data points may be used to establish or calculate a linear relationship between the metrology measurements and the various wafers in the batch or lot. This relationship may coincide with previously known tool behavior and variation(s), which may be a factor in determining a relative confidence level relating to the accuracy of the linear relationship.

In an alternative embodiment, the illustrations and descriptions related to FIGS. 5A-5D may also apply to individual lots or wafers (instead of individual wafer). In other words, the metrology measurements (i.e., value-A, B, C, D, E) illustrated in FIG. 5A-5D may correlate to a lot #1, lot #10, lot #30, etc. Additionally, in yet another alternative embodiment, the illustrations and descriptions related to FIGS. 5A-5D may also apply to individual regions of a particular wafer (instead of an entire wafer). In other words, the metrology measurements (i.e., value-A, B, C, D, E) illustrated in FIG. 5A-5D may correlate to a region #1, region #10, region #30, etc.

As a result of the modeling unit 330 developing the linear relationship illustrated in FIG. 5A, metrology values relating to a non-sampled wafer (e.g., wafer #15), may be readily approximated using the graphical illustration of FIG. 5A. For example, the non-sampled wafer #15 may coincide with metrology value-E, which may be assigned to wafer #15. Post-process analysis of wafer #15 may take into account the fact that the metrology value-E, is an estimated inline and/or offline metrology value relating to wafer #15. Similarly, estimated metrology values relating to other non-sampled wafers may be readily approximated using the illustrative relationship depicted in FIG. 5A.

Figure 5B:
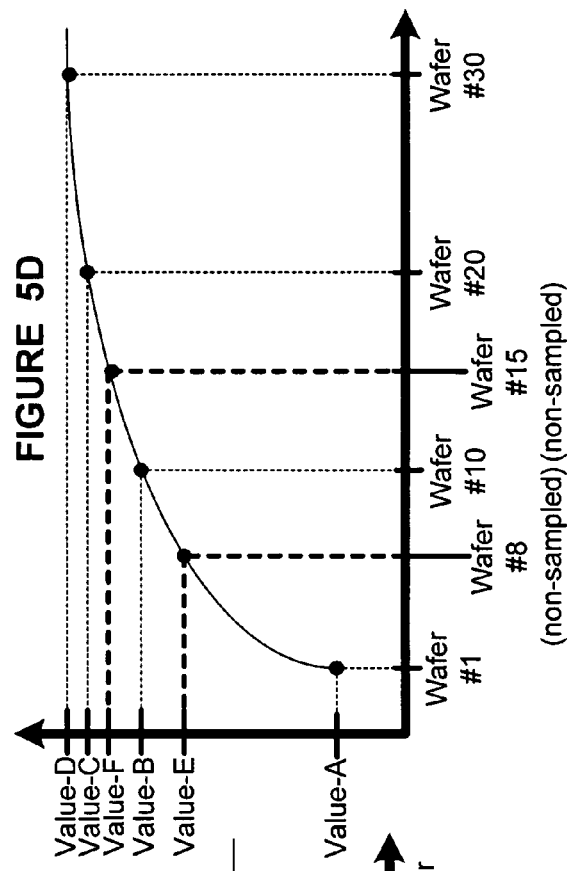

As illustrated in FIG. 5B, another exemplary model or calculation defining the relationship between particular metrology measurement values and various wafers in a batch or lot of wafers, may be developed. The metrology measurements relating to wafer #1, wafer #10, wafer #20, and wafer #30, may all coincide with a particular metrology value-A within an acceptable, predetermined margin of tolerance. Therefore, an estimated value (value-A) may be assigned to a particular a non-measured wafer, such as wafer #15. Since various sampled wafers may have provided metrology values within an acceptable range of metrology value-A, an acceptable amount of statistical confidence may be assumed when estimating that non-sampled wafers also contain the metrology value-A. Therefore, a certain level of confidence may exist for the estimation of metrology value associated with the exemplary relationship provided in FIG. 5B. This confidence may be reflected by the fact that the metrology value relating to the measured wafers generally coincide around the value A, within an acceptable margin of tolerance. Therefore, a relatively high amount of confidence may be associated with assigning the metrology measurement value-A to wafer #15.

Figure 5C:
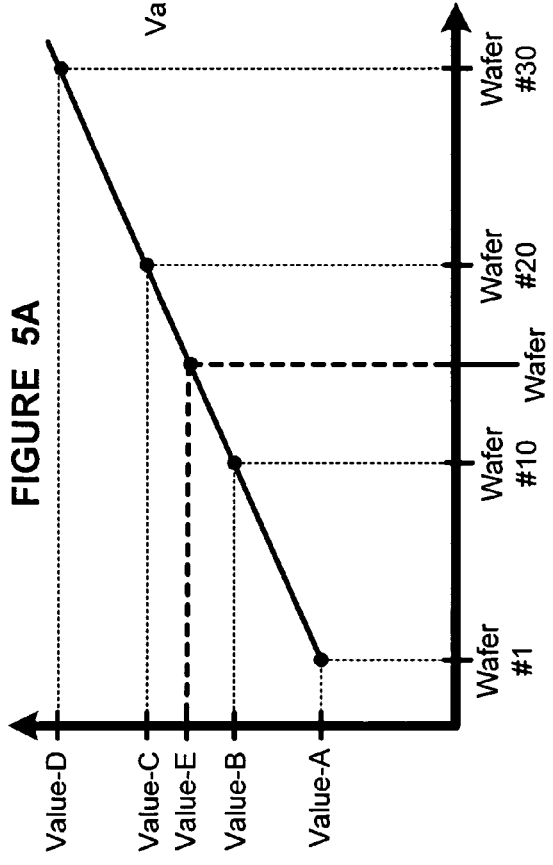

FIG. 5C depicts yet another illustrative graphical relationship between measured metrology measurements and sampled wafers. As illustrated in FIG. 5C, a range of values may change based upon the actual measured values of wafer #1, wafer #10, wafer #20, and wafer #30. For a period of time, the modeling unit 330 may approximate the behavior of the processing tool such that the approximated metrology measurement may be substantially consistent for that period of time. Therefore, a step-like function may be generated. In other words, if wafer #1 results in a metrology measurement value of A, behavior of the processing tool and other factors may be used to model or predict that several subsequent wafers may also possess the metrology value-A.

Utilizing this method, wafer #8 may be estimated to have the metrology measurement value of C since it is relatively close to sampled wafer #10, which was actually measured and was found to contain metrology measurement of value-C. Similarly, wafer #17 may be approximated to contain a metrology measurement value B, since the actually sampled wafer #20 resulted in metrology measurement value-B. The confidence level of the relationship illustrated in FIG. 5C may be of lower value, as compared to the confidence level of FIG. 5B or of FIG. 5A, which provide more linear relationships. FIG. 5C illustrates a constantly moving value based upon the actual measured data, thereby meriting a lower confidence value being attached to the approximation of metrology values of non-sampled wafers.

Figure 5D:
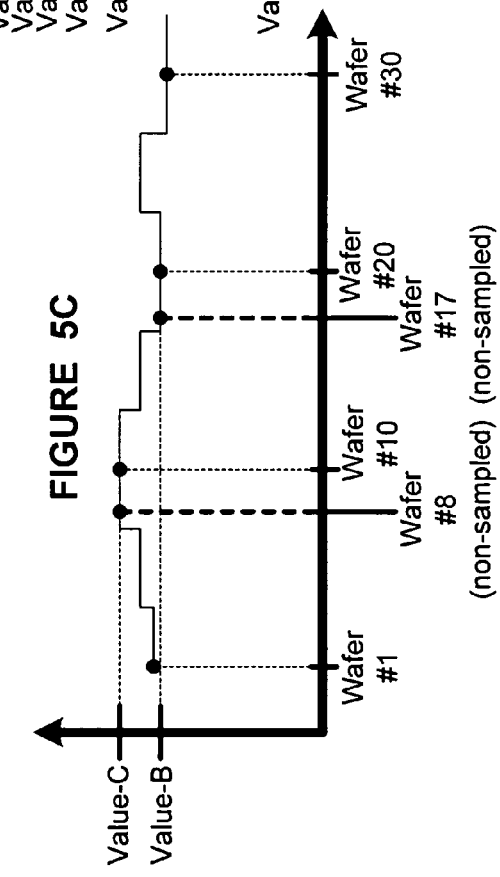

Turning now to FIG. 5D, an exemplary non-linear relationship between the measured wafers and actual metrology measurement values is depicted. The non-linear curve illustrated in FIG. 5D may be modeled or predicted using the measured value of wafer #1, resulting in metrology value-A; a measured value of wafer #10 resulting in metrology value-B; a measured value of wafer #20 resulting in metrology value C; and a measured value of wafer #30 resulting in a metrology value D. As illustrated in FIG. 5D, a non-linear curve may be developed based upon the various factors, such as measured values, knowledge of tool behavior, historical data, tool state data, and the like. This non-linear relationship may provide an estimated metrology value-E for the non-sampled wafer #8. Also, an estimate of metrology value-F may be associated with the non-sampled wafer #15. Due to the fact that a non-linear relationship was used to approximate or estimate metrology values associated with non-measured wafers, the confidence level may be relatively lower than the confidence level associated with the more linear relationships provided in FIGS. 5A and 5B. Therefore, any post-process analysis may take into account the amount of confidence relating to the values associated with non-measured wafers.

Utilizing the exemplary relationships provided in FIGS. 5A-5D, the modeling unit 330 may readily provide estimated inline and/or offline metrology values associated with non-measured/non-sampled wafers. Those skilled in the art would appreciate that other relationships may be formed and modified as newer data is received for approximating metrology values for non-measured wafers, and yet remain within the spirit and scope of the present invention.

Figure 6:
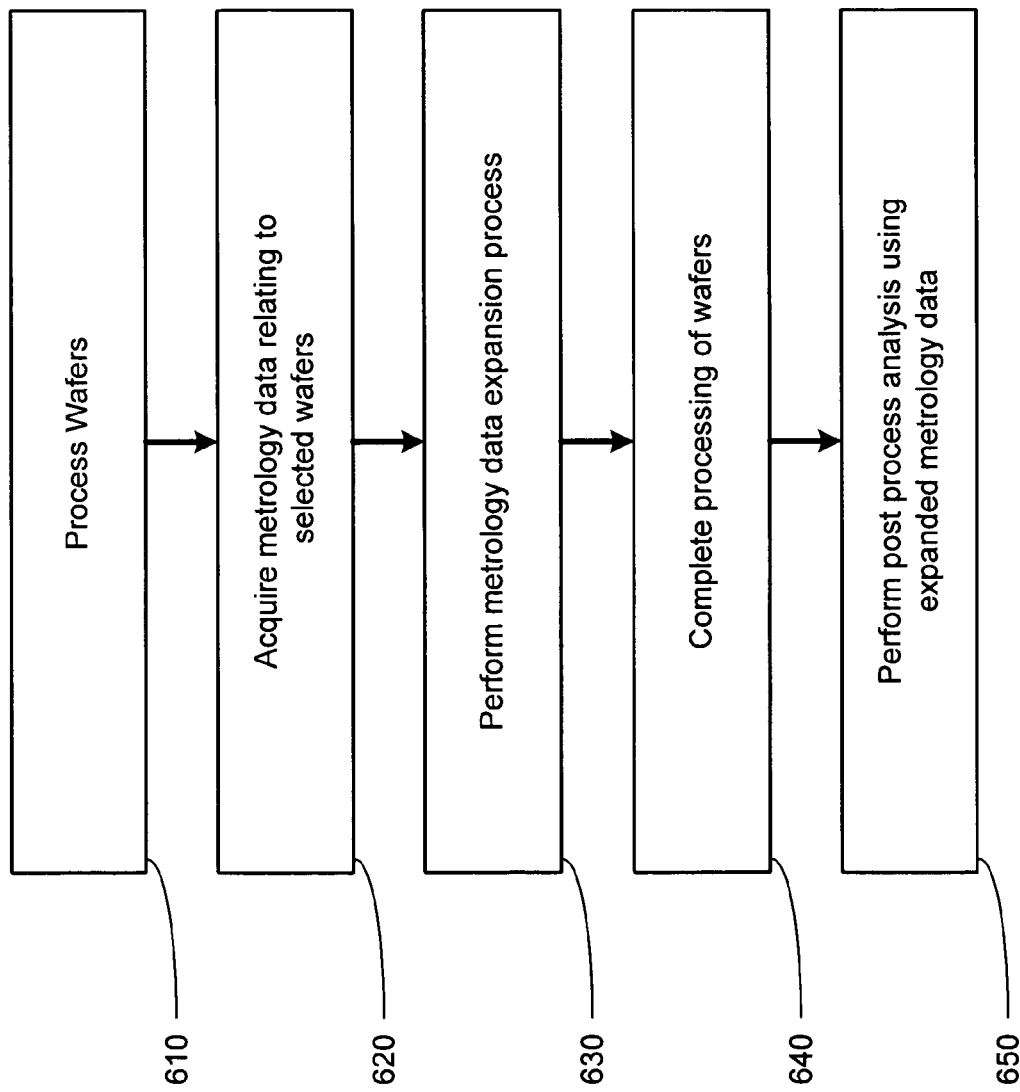
FIG. 6 illustrates a flow chart depiction of the steps of the methods in accordance with an illustrative embodiment of the present invention.

Turning now to FIG. 6, a flowchart depiction of the steps associated with a method in accordance with an illustrative embodiment of the present invention is provided. In one example, the system 300 may process a series of wafers in a batch or a lot (block 610). Exemplary processes performed on the wafers may include, but is not limited to, a deposition process, an etch process, a photolithography process, a chemical-mechanical planarization (CMP), etc. Based upon this processing, metrology data may be acquired on selected wafers (block 620). These selected wafers or sampled wafers, may be selected based upon strategic predetermined plans. For example, in order to develop a linear relationship relating to metrology values for measured and non-measured wafers, wafers in particular intervals (e.g., as every fifth wafer), may be selected for measurements. Additionally, as process conditions change or as metrology results significantly shift beyond predetermined levels, additional wafers may be sampled to provide more accurate relationships between sampled and non-sampled metrology values. Based upon the acquired metrology data, a metrology data expansion process may be performed (block 630). The metrology data expansion process may provide for estimating and assigning metrology values to non-sampled wafers. More detailed descriptions of the metrology data expansion process are provided in FIG. 7, and accompanying description below.

Upon acquisition of metrology data related to selected wafers and the performance of the metrology expansion process, the remaining processes to be performed on the wafers may be completed (block 640). In one embodiment, the metrology data expansion process may be performed after each process is performed on the wafers. In an alternative embodiment, the metrology expansion process may be performed after completion of critical or predetermined process steps. Subsequent to completing the processing of the wafers, a post-process analysis may be performed using the actual and/or estimated metrology data. The post-processing analysis may include correlating particular post-process results, such as performance, yield, etc., to particular inline parameters, including actual and/or projected metrology data.

Figure 7:
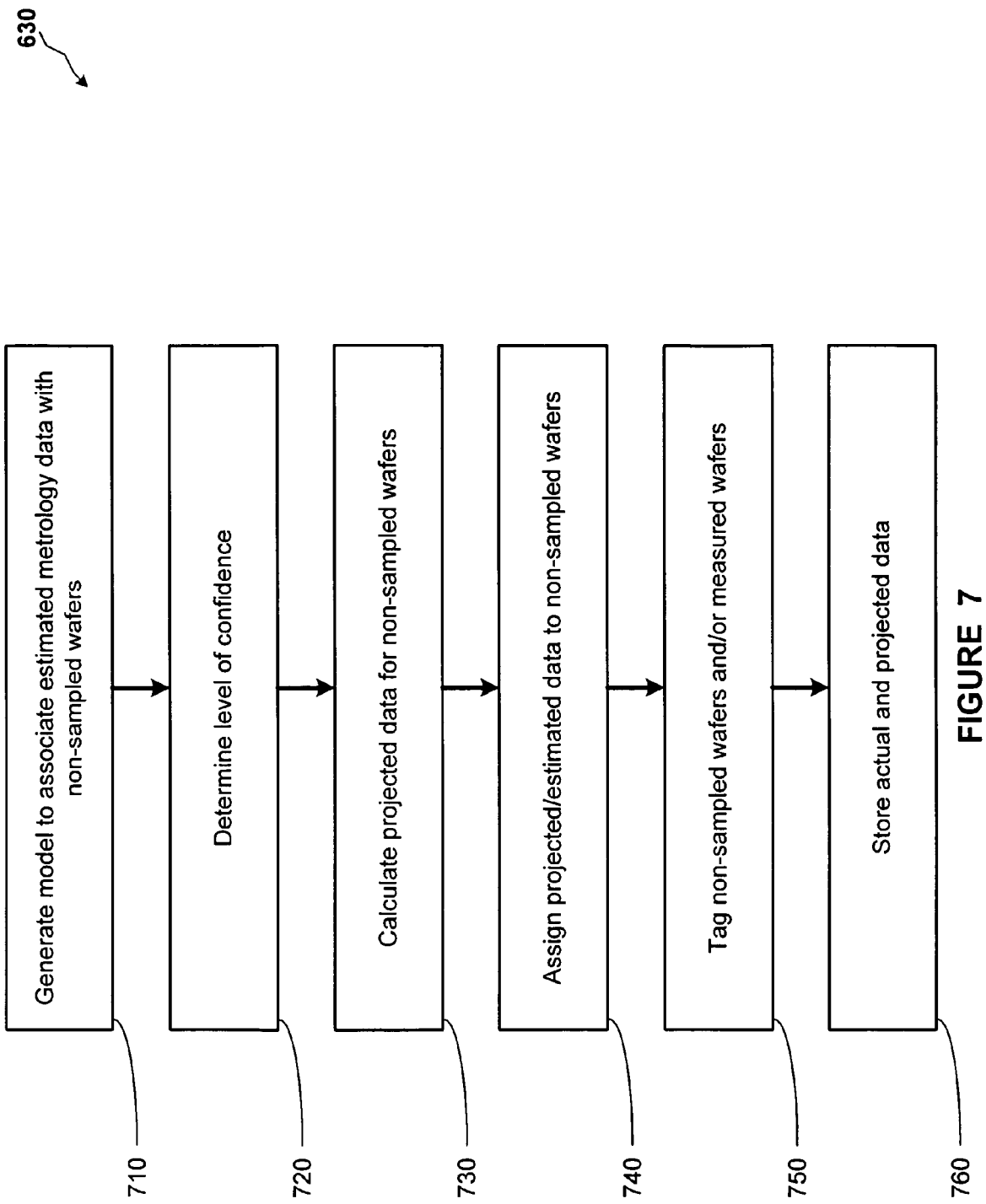
FIG. 7 illustrates a more detailed flow chart depiction of the steps of performing a metrology data expansion process of FIG. 6, in accordance with an illustrative embodiment of the present invention.

Turning now to FIG. 7, a more detailed depiction of the step of performing the metrology data expansion process of block 630 of FIG. 6, is illustrated. The system 300 may generate a model to assign inline data to non-sampled or unmeasured wafers (block 710). The model may use various factors to approximate inline and/or offline metrology data relating to non-sampled wafers. These factors may include actual measured values, the type of process being performed on the wafers, the number of samples that are used to acquire actual inline data, the complexity of the statistical analysis to be performed on the actually acquired metrology data, historical data, etc. Based upon the model, a level of statistical confidence is developed (block 720). The statistical confidence may be associated with the confidence relating to the accuracy of the estimated metrology data relating to a non-sampled wafer. In other words, the confidence may relate to how close is the estimated metrology value to a hypothetical value that would have been obtained had the non-sampled wafer been actually measured. The statistical confidence may be based upon statistical analysis performed using actual measured data, prior historical data, tool state data, historical processing tool performance, historical variation of the processing tools, etc.

Based upon the statistical confidence, the projected or estimated data relating to the non-sampled wafers may be calculated (block 730). This may include modifying the originally calculated metrology value based upon the calculated statistical confidence. Upon calculation of the projected metrology data, the data may be assigned to a particular non-sampled wafer (block 740). The system 300 may also "tag" the non-sampled wafers to indicate that the metrology data associated with the non-sampled wafer is actually estimated data and not actually measured metrology data (block 750). The system 300 may also tag actually measured data to indicate that metrology data associated with those wafers are actual data. The tag may include a variety of types of software tags or hardware tags known to those skilled in the art, having the benefit of the present disclosure. The system 300 may also store the actual and projected data for later retrieval and/or analysis (block 760).

Utilizing the embodiments of the present invention, metrology data may be associated with all processed wafers, including non-sampled or unmeasured wafers. A confidence level may be associated with the value assigned to non-sampled wafers. Based upon the value of the non-sampled wafers, as well as the associated confidence level, the system 300 may provide various analyses, including post-process analysis. A more robust post-process analysis is made possible by providing data associated with all processed wafers, including non-sampled wafers. Therefore, if a sampled wafer is not available at the post-process stage, data is still available for non-sampled wafers for analysis with corresponding post-process results. Hence, wafers that have dropped out of the production line due to any number of reasons (e.g., re-routing to alternative processing stages, scrapping, rework processing, etc.,) may not significantly impair the ability to perform efficient and accurate post-process analysis. The post process analysis may be based upon correlating metrology data with post-process results. Additionally, more historical data may now be available for further analysis at a later time. Embodiments of the present invention provide for more accurate analysis of process results based upon the efficient development of metrology data expansion for substantially all processed wafers.

The principles taught by the present invention can be implemented in an Advanced Process Control (APC) Framework, such as a Catalyst system formerly offered by KLA Tencor, Inc. The Catalyst system uses Semiconductor Equipment and Materials International (SEMI) Computer Integrated Manufacturing (CIM) Framework compliant system technologies, and is based on the Advanced Process Control (APC) Framework. CIM (SEMI E81-0699—Provisional Specification for CIM Framework Domain Architecture) and APC (SEMI E93-0999—Provisional Specification for CIM Framework Advanced Process Control Component) specifications are publicly available from SEMI. The APC framework is a preferred platform from which to implement the control strategy taught by the present invention. In some embodiments, the APC framework can be a factory-wide software system; therefore, the control strategies taught by the present invention can be applied to virtually any of the semiconductor manufacturing tools on the factory floor. The APC framework also allows for remote access and monitoring of the process performance. Furthermore, by utilizing the APC framework, data storage can be more convenient, more flexible, and less expensive than local drives. The APC framework allows for more sophisticated types of control because it provides a significant amount of flexibility in writing the necessary software code.

Deployment of the control strategy taught by the present invention onto the APC framework could require a number of software components. In addition to components within the APC framework, a computer script is written for each of the semiconductor manufacturing tools involved in the control system. When a semiconductor manufacturing tool in the control system is started in the semiconductor manufacturing fab, it generally calls upon a script to initiate the action that is required by the process controller, such as the overlay controller. The control methods are generally defined and performed in these scripts. The development of these scripts can comprise a significant portion of the development of a control system. The principles taught by the present invention can be implemented into other types of manufacturing frameworks.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular embodiments disclosed above may be altered or modified and all such variations are considered within the scope and spirit of the invention. Accordingly, the protection sought herein is as set forth in the claims below.

What is claimed:

1. A method, comprising:
   receiving measured metrology data relating to a first workpiece;
   approximating metrology data corresponding to a second workpiece based upon said metrology data relating to said first workpiece to provide a projected metrology data relating to said second workpiece and
   determining an estimated level of accuracy relating to said projected metrology data corresponding to said second workpiece.

2. The method of claim 1, further comprising processing a subsequent workpiece.

3. The method of claim 1, wherein receiving inline data relating to said first workpiece comprises receiving metrology data relating to a process performed upon said first workpiece.

4. The method of claim 1, further comprising storing projected inline data.

5. The method of claim 1, wherein approximating metrology data corresponding to a second workpiece comprises modeling a relationship relating to a process performed on said first and second workpieces and an inline data value relating to said process.

6. The method of claim 5, further comprising performing a statistical analysis to perform said modeling.

7. The method of claim 6, performing said statistical analysis comprises determining a level of confidence relating to said projected inline data.

8. The method of claim 1, further comprising performing post-process analysis relating to said first and said second workpieces based upon actual metrology data and said projected metrology data.

9. The method of claim 1, further comprising acquiring tool state data relating to said processing of said first and second workpieces.

10. The method of claim 9, wherein approximating metrology data corresponding to said second workpiece comprises using at least one of said tool state data, an inline measured data, a historical metrology data, and a tool variance data for modeling a relationship between processing of said second workpiece and projected inline data relating to processing of said second workpiece.

11. The method of claim 1, further comprising assigning a tag associated with said second workpiece indicating said projected metrology data being associated said second workpiece.

12. A method, comprising:
   performing a first process upon a first workpiece;
   acquiring metrology data relating to said first workpiece resulting from said first process;
   performing said first process upon a second workpiece;
   modeling a relationship between said first process and said metrology data relating to said first workpiece; and
   determining an estimated metrology data relating to said second workpiece resulting from said first process based upon said modeling of said relationship between said first process and said metrology data and
   determining an estimated level of accuracy relating to said estimated metrology data relating to said second workpiece.

13. The method of claim 11, further comprising determining a level of confidence relating to said estimated metrology data.

14. The method of claim 10, further comprising processing a subsequent workpiece.

15. A method, comprising:
performing a process upon a plurality of workpieces;
selecting a set of sampled workpieces from said plurality of workpieces;
acquiring actual metrology data relating to said sampled workpieces;
modeling a metrology data relationship between said plurality of workpieces and said acquired approximate metrology data for said process;
generating projected metrology data relating to non-sampled workpieces based upon said modeled relationship;
assigning said projected metrology data to said non-sampled workpieces and
determining a confidence level relating to the accuracy associated with said projected metrology data relating to said non-sampled workpieces.

16. The method of claim 15, further comprising processing a subsequent workpiece.

17. A method, comprising:
performing a process upon a plurality of workpieces;
selecting a set of sampled workpieces from said plurality of workpieces;
acquiring actual metrology data relating to said sampled workpieces;
modeling a metrology data relationship between said plurality of workpieces and said acquired metrology data for said process;
generating a projected metrology data relating to non-sampled workpieces based upon said modeling;
storing said projected metrology data relating to non-sampled workpieces and
determining a statistical confidence level relating to the accuracy associated with said projected metrology data relating to said non-sampled workpieces.

18. The method of claim 17, further comprising processing a subsequent workpiece.

19. A system, comprising:
a plurality of workpieces;
a metrology tool to acquire metrology data from a sample workpiece from said plurality of workpieces;
a controller to approximate corresponding metrology data relating to at least one non-sampled workpiece from said plurality of workpieces based upon said metrology data relating to said sampled workpiece to provide a projected metrology data, said controller to determine an estimated level of accuracy relating to said approximated metrology data relating to said at least one non-sampled workpiece.

20. The system of claim 16, wherein said processing tool to process a subsequent workpiece.

21. The system of claim 16, wherein said controller is a central control unit capable of controlling a plurality of process units, said plurality of process units each comprising at least one processing tool, a metrology tool, and a tool controller for controlling at least one of said processing tool and said metrology tool.

22. The system of claim 16, wherein said workpiece is a semiconductor wafer.

23. An apparatus, comprising:
a controller to approximate corresponding metrology data relating to at least one non-sampled workpiece from plurality of processed plurality of workpieces based upon metrology data relating to said sampled workpiece to provide a projected metrology data, said controller to determine an estimated level of accuracy relating to said approximated metrology data relating to said at least one non-sampled workpiece.

24. The apparatus of claim 20, wherein said workpiece is a semiconductor wafer.

25. An apparatus, comprising:
means for receiving measured metrology data relating to a first workpiece;
means for approximating metrology data corresponding to a second workpiece based upon said metrology data relating to said first workpiece to provide a projected metrology data relating to said second workpiece and
means for determining a estimated level of accuracy of relating to said projected metrology data corresponding to said second workpiece.

26. A computer readable program storage device encoded with instructions that, when executed by a computer, performs a method, comprising:
receiving measured metrology data relating to a first workpiece;
approximating metrology data corresponding to a second workpiece based upon said metrology data relating to said first workpiece to provide a projected metrology data relating to said second workpiece and
determining a estimated level of accuracy relating to the said projected metrology data corresponding to said second workpiece.

27. The computer readable program storage device encoded with instructions that, when executed by a computer, performs the method of claim 23, further comprising storing said projected inline data.

28. The computer readable program storage device encoded with instructions that, when executed by a computer, performs the method of claim 23, wherein approximating corresponding inline data relating to a second workpiece comprises modeling a relationship relating to a process performed on said first and second workpieces and an inline data value relating to said process.

29. The computer readable program storage device encoded with instructions that, when executed by a computer, performs the method of claim 25, further comprising performing a statistical analysis to perform said modeling.

30. The computer readable program storage device encoded with instructions that, when executed by a computer, performs the method of claim 25, performing said statistical analysis further comprises determining a level of confidence relating to said projected inline data.

31. The computer readable program storage device encoded with instructions that, when executed by a computer, performs the method of claim 27, wherein approximating corresponding inline data relating to a second workpiece further comprising using at least one of a tool state data, said inline measured data, a historical metrology data, and a tool variance data for modeling a relationship between processing of said second workpiece and projected inline data relating to processing of said second workpiece.

32. The computer readable program storage device encoded with instructions that, when executed by a computer, performs the method of claim 23, further comprising assigning a tag associated with said second workpiece indicating said projected inline data being associated said second workpiece.

* * * * *